United States Patent
Wang et al.

(10) Patent No.: US 8,271,651 B1
(45) Date of Patent: Sep. 18, 2012

(54) METHODS AND SYSTEMS FOR REGULATING RESOURCE USAGE

(75) Inventors: Niniane Wang, Santa Clara, CA (US); Stephen R. Lawrence, Mountain View, CA (US); Mihai Florin Ionescu, Mountain View, CA (US)

(73) Assignee: Google Inc., Mountain View, CA (US)

( * ) Notice: Subject to any disclaimer, the term of this patent is extended or adjusted under 35 U.S.C. 154(b) by 861 days.

(21) Appl. No.: 10/750,128

(22) Filed: Dec. 31, 2003

(51) Int. Cl.
*G06F 15/173* (2006.01)
(52) U.S. Cl. ........................ 709/226; 709/219; 709/220
(58) Field of Classification Search .......... 709/201–203, 709/205, 225, 228; 710/58, 267; 712/220, 712/228, 229; 718/102, 104
See application file for complete search history.

(56) References Cited

U.S. PATENT DOCUMENTS

| | | | | |
|---|---|---|---|---|
| 5,838,968 | A * | 11/1998 | Culbert | 718/104 |
| 5,909,544 | A * | 6/1999 | Anderson et al. | 709/208 |
| 6,006,222 | A | 12/1999 | Culliss | |
| 6,014,665 | A | 1/2000 | Culliss | |
| 6,078,916 | A | 6/2000 | Culliss | |
| 6,182,068 | B1 | 1/2001 | Culliss | |
| 6,199,204 | B1 | 3/2001 | Donohue | |
| 6,493,871 | B1 | 12/2002 | McGuire et al. | |
| 6,499,027 | B1 | 12/2002 | Weinberger | |
| 6,539,340 | B1 * | 3/2003 | Robins et al. | 702/186 |
| 6,560,614 | B1 | 5/2003 | Barboy et al. | |
| 6,581,056 | B1 | 6/2003 | Rao | |
| 6,704,816 | B1 * | 3/2004 | Burke | 710/100 |
| 6,862,623 | B1 * | 3/2005 | Odhner et al. | 709/226 |
| 6,877,037 | B1 | 4/2005 | Adachi | |
| 6,970,698 | B2 | 11/2005 | Majmundar et al. | |
| 6,971,094 | B1 | 11/2005 | Ly | |
| 6,990,660 | B2 | 1/2006 | Moshir et al. | |
| 7,028,298 | B1 * | 4/2006 | Foote | 718/104 |
| 7,203,943 | B2 * | 4/2007 | Shaffer | 718/104 |
| 7,516,118 | B1 | 4/2009 | Badros et al. | |
| 7,707,573 | B1 | 4/2010 | Marmaros et al. | |
| 7,734,867 | B1 * | 6/2010 | Keeton et al. | 711/114 |
| 2001/0003831 | A1 * | 6/2001 | Boland | 709/226 |
| 2001/0054026 | A1 | 12/2001 | Choate | |
| 2002/0143952 | A1 | 10/2002 | Sugiarto et al. | |
| 2002/0152305 | A1 * | 10/2002 | Jackson et al. | 709/224 |
| 2002/0166117 | A1 | 11/2002 | Abrams et al. | |
| 2003/0033402 | A1 * | 2/2003 | Battat et al. | 709/224 |
| 2003/0154112 | A1 * | 8/2003 | Neiman et al. | 705/5 |
| 2003/0167266 | A1 | 9/2003 | Saldanha et al. | |
| 2003/0217297 | A1 * | 11/2003 | Gschwind et al. | 713/300 |
| 2004/0098361 | A1 | 5/2004 | Peng | |

(Continued)

OTHER PUBLICATIONS

Silberschatz, A., et al., "Operating System Concepts", sixth edition. New Jersey: John Wiley & Sons, Inc., Mar. 8, 2002 (see attached pages), pp. 27-52, 151-185 and 491-528.*

(Continued)

*Primary Examiner* — Kenny Lin
*Assistant Examiner* — Scott M Sciacca
(74) *Attorney, Agent, or Firm* — Fenwick & West LLP (57) ABSTRACT

Methods and systems for regulating resource usage of an application are disclosed. A method of regulating usage of an application is disclosed that comprises receiving an operating parameter of a client device, assigning a value to a usage variable associated with the operating parameter of the client device, and correlating by an application a resource usage level of the application with the usage variable.

41 Claims, 2 Drawing Sheets

U.S. PATENT DOCUMENTS

| | | | |
|---|---|---|---|
| 2004/0143569 A1 | 7/2004 | Gross et al. | |
| 2004/0148484 A1* | 7/2004 | Watanabe et al. | 711/170 |
| 2004/0221184 A1* | 11/2004 | Hellerstein et al. | 713/300 |
| 2004/0255295 A1* | 12/2004 | Stackhouse et al. | 718/100 |
| 2004/0261081 A1* | 12/2004 | Sen | 719/313 |
| 2004/0267548 A1* | 12/2004 | Jones | 705/1 |
| 2005/0091344 A1* | 4/2005 | Chen et al. | 709/219 |
| 2005/0149932 A1* | 7/2005 | Hasink et al. | 718/100 |

OTHER PUBLICATIONS

U.S. Appl. No. 10/749,440, filed Dec. 31, 2003, Badros et al.

80-20 Software—Products—80-20 One Search. http://www.80-20.com/products/one-search/retriever.asp, printed Mar. 16, 2004.

"askSam™ Making Information Useful," askSam,—Organize your information with askSam, http://www.asksam.com/brochure.asp, printed Mar. 15, 2004.

Alexa® Web Search—Toolbar Quick Tour, http://pages.alexa.com/prod_serv/quicktour.html, pp. 1-5, printed Mar. 16, 2004.

Barrett, R. et al., "How to Personalize the Web," IBM Research, http://www.almaden.ibm.com/cs/wbi/papers/chi97/wbipaper.html, pp. 1-13, printed Mar. 16, 2004.

Battelle, J., CNN.com "When geeks go camping, ideas hatch," http://www.cnn.com/2004/TECH/ptech/01/09/bus2.feat.geek.camp/index.html, pp. 1-3, printed Jan. 13, 2004.

Boyan, J., et al., "A Machine Learning Architecture for Optimizing Web Search Engines," School of Computer Science, Carnegie Mellon University, May 10, 1996, pp. 1-8.

Bradenbaugh, F., "Chapter 1 The Client-Side Search Engine," *JavaScript Cookbook*, 1st Ed., Oct. 1999, O'Reilly™ Online Catalog, http://www.oreilly.com/catalog/jscook/chapter/ch01.html, pp. 1-30, printed Dec. 29, 2003.

Brin. S., et al, "The Anatomy of a Large-Scale Hypertextual Web Search Engine," http://www7.scu.edu.au/programme/fullpapers/1921/com1921.htm, pp. 1-18, 1998.

Budzik, J., et al., User Interactions with Everyday Applications as Context for Just-in-time Information Access, Intelligent Information Laboratory, Northwestern University, pp. 1-8, no date.

Devonthink, http://www.devon-techonologies.com/products/devonthink.php, printed Mar. 16, 2004.

dtSearch®—http://www.dtsearch.com/, printed Mar. 15, 2004.

Dumais, S., et al, "Stuff I've Seen: A System for Personal Information Retrieval and Re-Use," Microsoft Research, *SIGIR '03*, Jul. 28-Aug. 1, 2003, pp. 1-8.

Enfish, http://www.enfish.com, printed Mar. 16, 2004.

Fast Search & Transfer—Home—Enterprise Search, http://solutions.altavista.com/en/news/or_020402_desktop.shtmu, printed Mar. 16, 2004.

Fertig, S., et al., "Lifestreams: An Alternative to the Desktop Metaphor," http://www.acm.org/sigchi/chi96/proceedings/videos/Fertig/etf.htm, pp. 1-3, printed Mar. 16, 2004.

Geisler, G., "Enriched Links: A Framework for Improving Web Navigation Using Pop-Up Views," pp. 1-14, 2000.

ISYS Search Software—ISYS: desktop, http://www.isysusa.com/products/desktop/index.html, printed Mar. 16, 2004.

Joachims, T., et al., "WebWatcher: A Tour Guide for the World Wide Web," 1996.

Markoff, J., "Google Moves Toward Clash with Microsoft," *The New York Times*, May 19, 2004, http://www.nytimes.com/2004/5/19/technology/19google.html?ex=1085964389&ei=1&e... pp. 1-4, printed May 19, 2004.

Naraine, R., "Future of Search Will Make You Dizzy," Enterprise, May 20, 2004, http://www.internetnews.com/ent-news/article.php/3356831, pp. 1-4, printed May 21, 2004.

"Overview," Stuff I've Seen—Home Page, http://research.Microsoft.com/adapt/sis/index.htm, pp. 1-2, printed May 26, 2004.

Rhodes, B., "Margin Notes Building a Contextually Aware Associative Memory," *The Proceedings of the International Conference on Intelligent User Interfaces (IUI'00)*, Jan. 9-12, 2000.

Rhodes, B., et al., "Just-in-time information retrieval agents," *Systems Journal*, vol. 39, Nos. 3&4. 2000, pp. 685-704.

Rhodes, B., et al., "Remembrance Agent—A continuously running automated information retrieval system," *The Proceedings of the First International Conference on the Practical Application of Intelligent Agents and Multi Agent Technology* (PAAM '96), pp. 487-495.

Rizzo, T., "WinFS 101: Introducing the New Windows File System," Longhorn Developer Center Home: Headline Archive: WinFS 101: Introducing the New . . . , http://msdn.Microsoft.com/Longhorn/archive/default.aspx?pull+/library/en-us/dnwinfs/htm..., pp. 1-5, printed Apr. 21, 2004.

"Searching for the next Google—New trends are helping nimble startups elbow in to the plundered market," Red Herring—The Business of Technology, Mar. 9, 2004, http://redherring.com/PrintArticle.aspx?a=4782&sector=Capital, p. 1-5, printed Mar. 30, 2004.

"Selecting Task-Relevant Sources for Just-In-Time Retrieval," pp. 1-3, no date.

Sherman, C., "HotBot's New Desktop Search Toolbar," www.searchenginewatch.com, http://searchenginewatch.com/searchday/print.php/34711_339921, pp. 1-3, printed Apr. 14, 2004.

"Standardization Priorities for the Directory—Directory Interoperability Forum White Paper," The Open Group, Dec. 2001, pp. 1-21.

Sullivan, D., "Alta Vista Releases Search Software," *The Search Engine Report*, Aug. 4, 1998, pp. 1-2.

WebWatcher Home Page, "Welcome to the WebWatcher Project," http://www-2.cs.cmu.edu/~webwatcher/, printed Oct. 15, 2003.

"WhenU Just-In-Time Marketing," http://www.whenu.com, printed Mar. 19, 2004.

X1 instantly searches files & email. For outlook. Outlook, http://www.x1.com/, printed Mar. 15, 2004.

Zellweger, P., et al., "Fluid Links for Informed and Incremental Link Transitions," Proceedings of Hypertext'98, Pittsburgh, PA, Jun. 20-24, 1998, pp. 50-57.

"Alexa Web Search—Toolbar Quick Tour," Alexa Internet, Inc., 1996-2006, [online] [Retrieved on Oct. 29, 2006] Retrieved from the Internet<URL:http://pages.alexa.com/prod_serv/quicktour_new.html>.

Archive of "Remem: The Remembrance Agent," Bradley Rhodes, Feb. 16, 2004, www.remem.org, [online] [Archived by http://archive.org on Aug. 2, 2003; Retrieved on Oct. 20, 2006] Retrieved from the Internet<URL:http://web.archive.org/web/20030802195037/www.remem.org>.

Balazinska, M., et al., "Characterizing mobility and network usage in a corporate wireless local-area network", Proceedings of MobiSys 2003: The First International Conference on Mobile Systems, Applications, and Services, USENIX Association, May 5-8, 2003, pp. 303-316. Can be retrieved online at <URL:http://delivery.acm.org/10.1145/1 070000/1 066127/p303-balazinska.pdf>.

Dalal, A., et al., "An optimal service ordering for a world wide web server", ACM SIGMETRICS Performance Evaluation Review, Sep. 2001, pp. 8-13, vol. 29, issue 2. Can be retrieved online at <URL:http://delivery.acm.org/1 0.1145/580000/572319/p8-dalal.pdf>.

Hsieh, H-Y., et al., "A transport layer approach for achieving aggregate bandwidths on multi-homed mobile hosts", MOBICOM'02, Sep. 23-28, 2002, pp. 83-94. Can be retrieved online at <URL:http://delivery.acm.org/10.1145/580000/570656/p83-hsieh.pdf>.

Liu, Y., et al., "On the impact of concurrent downloads", Winter Simulation Conference Proceedings of the 33nd conference on Winter simulation, Dec. 2001, pp. 1300-1305. Can be retrieved online at <URL:http://delivery.acm.org/10.1145/570000/564314/p1300-liu.pdf>.

\* cited by examiner

METHODS AND SYSTEMS FOR REGULATING RESOURCE USAGE

RELATED APPLICATIONS

This application relates to U.S. patent application Ser. No. 10/749,439, filed herewith and entitled "Systems and Methods for Providing and Installing Software," the entirety of which is incorporated herein by reference. This application also relates to U.S. patent application Ser. No. 10/749,441, filed herewith and entitled "Systems and Methods for Providing Software Updates," the entirety of which is incorporated herein by reference.

FIELD OF THE INVENTION

The invention generally relates to methods of regulating resource usage of an application.

BACKGROUND

As World Wide Web ("web") search engines (sometimes referred to as "Internet Search Engines") have improved, many users have turned to these search engines for navigating the web, rather than inputting uniform resource locators (URLs) into browser address fields or using browser bookmarks. Search engines may perform searches of various databases, which may be public, e.g., the Internet, and/or private, e.g., an intranet, a client device, etc., using one or more known search techniques. For example, one known search technique, described in an article entitled, "The Anatomy of a Large-Scale Hypertextual Search Engine," by Sergey Brin and Lawrence Page, assigns a degree of importance to a document, such as a web page, based on the link structure of the web.

These search engines may be applied to information over the web or over information on a user's local hard drive. Some search methods often involve computationally intensive applications. Some of these applications may fail as a practical matter, e.g., resulting in the user interrupting or discontinuing use of the system, because of the demands they place on client-device resources. Such resource demands can slow response time of the client device, use excessive amounts of central processing unit space, and use excessive amounts of processor memory, such as RAM, which often results in file swapping, and can degrade the overall user experience in certain circumstances.

What is needed is an improved method and system—especially in a high-bandwidth server environment—to dynamically regulate, e.g., throttle, the application's usage of the client device such that the user's perception of system performance is not affected in a material way by interaction with the application.

SUMMARY OF THE INVENTION

Embodiments of the present invention comprise methods and systems for regulating resource usage. In one exemplary embodiment, a method comprises receiving an operating parameter of the client device, assigning a value to a usage variable associated with the operating parameter of the client device, and correlating by an application a resource usage level of the application with the usage variable.

Another exemplary embodiment comprises a computer readable medium comprising instructions, that, when executed, cause an application to perform the steps of receiving an operating parameter of a client device, assigning a value to a usage variable associated with the operating parameter of the client device, and correlating a resource usage level of the application with the usage variable.

In both embodiments above, multiple operating parameters can be used simultaneously to generate a "resource utilization measure" which can be assigned to the usage variable and correlated with the resource usage level.

These exemplary embodiments are mentioned not to limit or define the invention, but to provide examples of embodiments of the invention to aid understanding thereof. Exemplary embodiments are discussed in the Detailed Description, and further description of the invention is provided there. Advantages offered by the various embodiments of the present invention may be understood by examining this specification.

BRIEF DESCRIPTION OF THE DRAWINGS

The accompanying drawings, which constitute part of this specification, help to illustrate embodiments of the invention.

DETAILED DESCRIPTION

Figure 1:
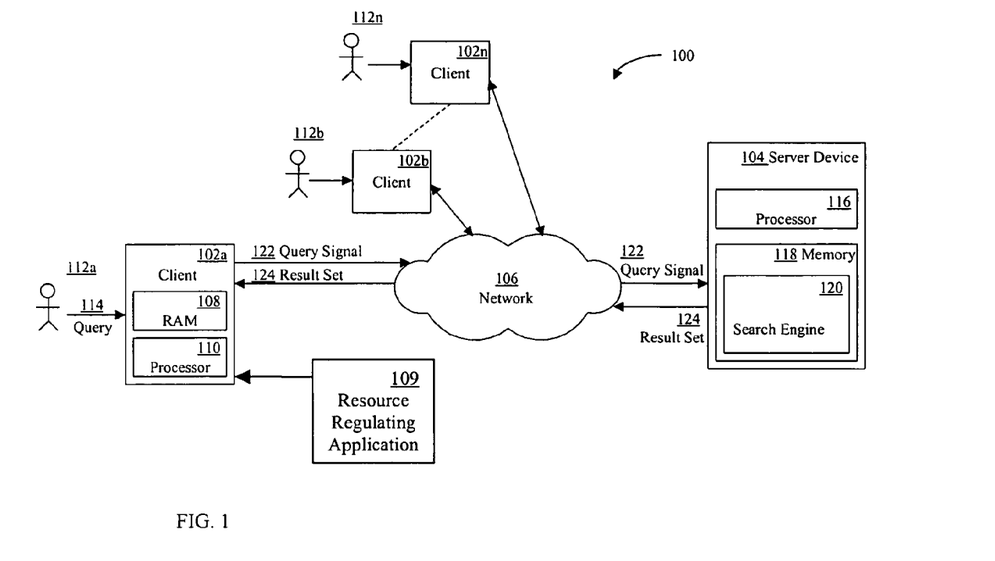
FIG. 1 is a block diagram of an exemplary environment for implementing an embodiment of the present invention.

Embodiments of the present invention include methods and systems for regulating resource usage. Referring now to the drawings in which like numerals indicate like elements throughout the several figures, FIG. 1 is a block diagram illustrating an exemplary environment for implementation of an embodiment of the present invention. The system 100 shown in FIG. 1 includes multiple client devices 102a-n in communication with a server device 104 over a network 106. The network 106 shown comprises the Internet. In other embodiments, other networks, such as an intranet may be used. Moreover, methods according to the present invention may operate within a single computer.

The client devices 102a-n shown each include a computer-readable medium, such as a random access memory (RAM) 108, coupled to a processor 110. As will be described in further detail below, the client devices 102a-n each include a resource regulating application. The processor 110 executes computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein. Embodiments of computer-readable media include, but are not limited to, an electronic, optical, magnetic, or other storage or transmission device capable of providing a processor, such as the processor 110 of client 102a, with computer-readable instructions. Other examples of suitable media include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, Python, Perl, and JavaScript.

Client devices 102a-n may also include a number of external or internal devices such as a mouse, a CD-ROM, DVD, a keyboard, a display, or other input or output devices. Examples of client devices 102a-n are personal computers, digital assistants, personal digital assistants, cellular phones, mobile phones, smart phones, pagers, digital tablets, laptop computers, Internet appliances, and other processor-based devices. In general, a client device 102a may be any type of processor-based platform that is connected to a network 106 and that interacts with one or more application programs. Client devices 102a-n may operate on any operating system capable of supporting a browser or browser-enabled application, such as Microsoft® Windows® or Linux. The client devices 102a-n shown include, for example, personal computers executing a browser application program such as Microsoft Corporation's Internet Explorer™, Netscape Communication Corporation's Netscape Navigator™, and Apple Computer, Inc.'s Safari™.

Through the client devices 102a-n, users 112a-n can communicate over the network 106 with each other and with other systems and devices coupled to the network 106. As shown in FIG. 1, a server device 104 is also coupled to the network 106. The server device comprises a server processor 116 and a server memory storage device 118. The server device 104 shown comprises a single computer. However, in other embodiments, the server device 104 may comprise multiple and/or distributed devices, or there may be no server device.

In one embodiment, a user 112a-n generates a search query 114 at a client device 102a. The client device 102a transmits the query 114 to the server device 104 via the network 106. For example, a user 112a types a textual search query into a query field of a web page of a search engine interface or other client-side software displayed on the client device 102a, which is then transmitted via the network 106 to the server device 104.

In the embodiment shown, a user 112a inputs a search query 114 at a client device 102a, which transmits an associated search query signal 122 reflecting the search query 114 to the server device 104. The search query 114 may be transmitted directly to the server device 104 as shown. In another embodiment, the query signal 122 may instead be sent to a proxy server (not shown), which then transmits the query signal 122 to server device 104. Other configurations are possible.

The server device 104 shown includes a server executing a search engine application program, such as the Google™ search engine. Similar to the client devices 102a-n, the server device 104 shown includes a processor 116 coupled to a computer-readable memory 118. Server device 104, depicted as a single computer system, may be implemented as a network of computer processors. Examples of a server device 104 are servers, mainframe computers, networked computers, a processor-based device, and similar types of systems and devices. Client processor 110 and the server processor 116 can be any of a number of computer processors, such as processors from Intel Corporation of Santa Clara, Calif. and Motorola Corporation of Schaumburg, Ill.

Memory 118 contains the search engine application program, also known as a search engine 120. The search engine 120 locates relevant information in response to a search query 114 from a user 112a-n. The search engine 120 then provides the result set 124 to the client 102a via the network 106.

In the embodiment shown, the server device 104, or related device, has previously performed a crawl of the network 106 to locate articles, such as web pages, stored at other devices or systems connected to the network 106, and indexed the articles in memory 118 or on another data storage device.

Articles include, for example, web pages of various formats, such as HTML, XML, XHTML, Portable Document Format (PDF) files, and word processor, database, and application program document files, audio, video, or any other documents or information of any type whatsoever made available on a network (such as the Internet), a personal computer, or other computing or storage means. The embodiments described herein are described generally in relation to HTML files or documents, but embodiments may operate on any type of article, including any type of image.

It should be noted that various embodiments of the present invention may comprise systems having different architecture than that which is shown in FIG. 1. For example, in some systems according to the present invention, server device 104 may comprise a single physical or logical server, or there may be no server. The system 100 shown in FIG. 1 is merely exemplary, and is used to explain the exemplary method shown in FIG. 2.

Various methods may be implemented in the environment shown in FIG. 1 and other environments according to the present invention. For example, in one embodiment, a resource regulating application 109 receives information regarding utilization of a processor 110 of the client device 102a-n. At a predetermined percentage of processor 110 utilization, the application 109 scales back (i.e., throttles) its requirements for processor 110 usage.

Thus, if the processor 110 is heavily utilized, the application 109 throttles-back its processor 110 requirements. This method alleviates performance degradation of the client device 102a-n that would be observable by the user 112a-n of the client device 102a-n if the application 109 utilized resources without regard to existing demands on the processor 110.

Throttling-back processor 110 requirements can be accomplished by pausing between execution of processor-intensive calculations, such as might be performed for some indexing steps. A similar process may occur for other resources, such as for example, memory 108 resources and communication resources (not shown). Throttling-back memory 108 can be accomplished by loading fewer components at one time or by having each component dynamically scale back on its memory usage. Communication (or bandwidth) requirements can be throttled-back by slowing download from the server 104, e.g., setting a lower priority or requesting less data at any one time. Of course, the reverse can be performed, i.e., throttling-up when resources become available.

Execution of the application may only comprise execution of a step or sequence of steps before again checking the processor 110 utilization. The application 109 may include logic that only allows a small sequence of steps to execute before checking a parameter that specifies whether throttling should be on or off. Thus, the steps above may be repeated almost constantly while the application 109 is active, which permits dynamic throttling in response to changing resource availability.

Of course, third party components (not shown) may interact with the system 100. For example, resource demand is called upon only when performance measures indicate that reasonable resources exist to execute the application 109.

Figure 2:
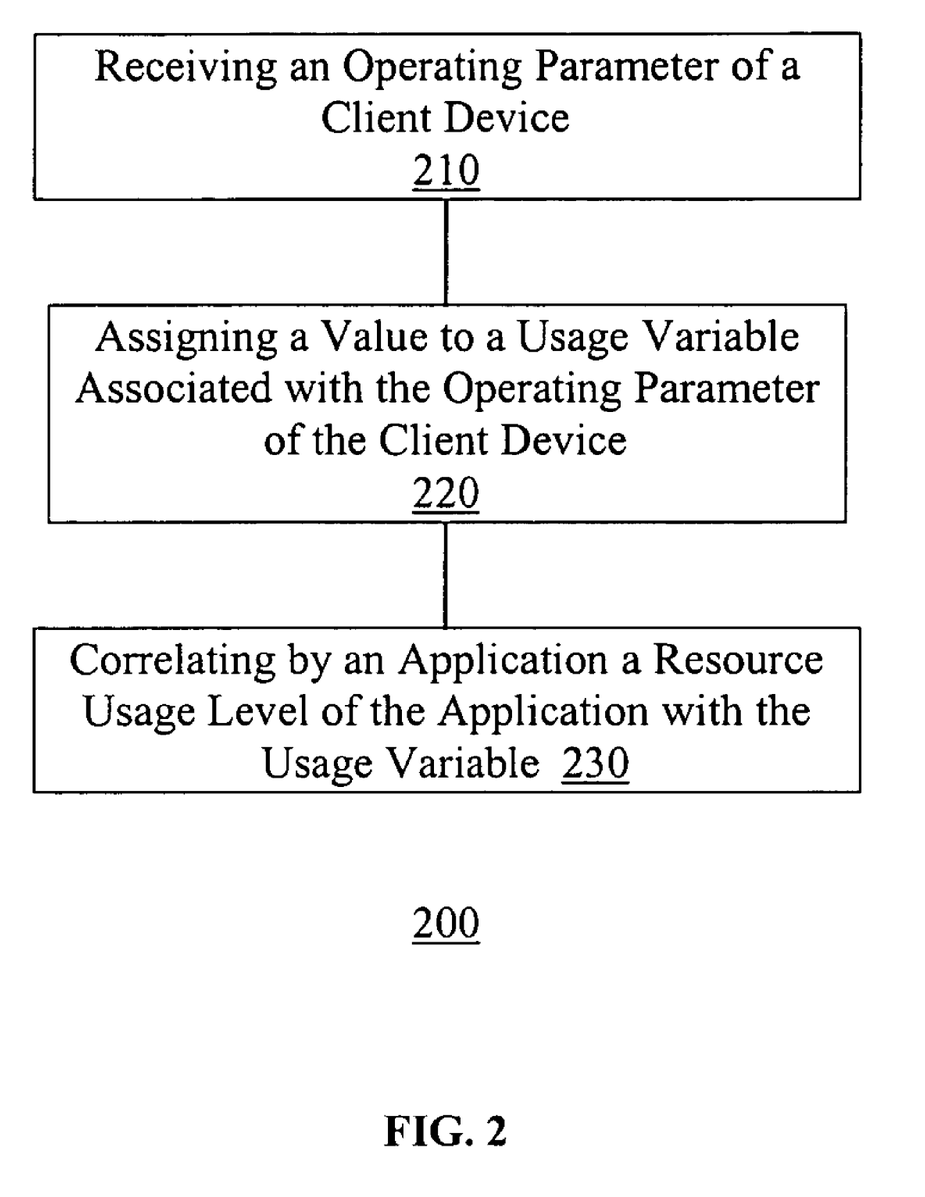
FIG. 2 is a block diagram of a method according to an embodiment of the present invention.

Referring now to FIG. 2, a method 200 according to an embodiment of the present invention is shown. The method 200 may be employed to regulate usage of a client device, such as for example, in the environment of the system 100 described above. Items shown in FIG. 1 are referred to in describing method 200 to aid understanding of this embodiment. However, methods according to other embodiments of the present invention may be employed in a wide variety of other environments.

As indicated by block 210, the method 200 comprises receiving one or more operating parameters of the client device 102a. Examples of operating parameters may include processor usage or load, number of processes and threads running, processor speed, memory capacity or size, power consumption, virtual memory paging, disk size, free space, transfer rate, I/O operations per second, and communication bandwidth, among others.

In one embodiment, receiving the operating parameter comprises monitoring the operating parameter. The operating parameter can be monitored by the application 109, by the client device 102a itself, or by the server 104. In this embodiment, the monitored parameter can then be transmitted to the application 109.

In one embodiment, the operating parameter of the client device comprises a client processor load. Generally, the load of the client device processor 110 comprises an amount of a total processing capacity of the client device processor 110 being used. Thus, the load is typically expressed in terms of a percentage of the total capacity. For example, a processor load of 50% means that, over some period of time, one-half of the processor 110 is being used, while the other half of the processor 110 is still available for use.

In one embodiment, receiving the operating parameter of the client device 102a, e.g., calling specific performance information, can be achieved by the resource regulating application 109 transmitting an inquiry signal (not shown) to the client device 102a. In one embodiment, the inquiry signal comprises code or data structure that causes the processor 110 to obtain the desired information and transmit that information to the application 109. Alternatively, receiving the operating parameter can be accomplished by other suitable means, such as active reporting by the processor 110 to the application 109, or calling an operating system function or set of functions.

In another embodiment, receiving the operating parameter of the client device 102a can be achieved by the server device 104 communicating an inquiry signal (not shown) to the client device 102a. In one embodiment, the inquiry signal comprises code or data structure that causes the client device 102a to obtain the desired information and transmit that information to the server device 104. Alternatively, receiving the operating parameter can be accomplished by other suitable means, such as active reporting by the client device 102a to the server device 104.

In another implementation of receiving 210, receiving the parameter comprises receiving the parameter during an initial load of the client processor 110. For example, the initial load may include the amount of a total capacity of the client processor 110 being used when the client device 102a begins operation or when communication is initiated or established between the client device 102a and server device 104 or between the client device 102a and the application 109. An initial load of 50% indicates that half of the computational capacity of the client processor 110 is available when the load is first received—usually when the client device 102a begins operation or when it first begins communicating with the server device 104 or with the application 109.

In one embodiment, receiving the parameter comprises receiving the parameter during a predetermined time interval. Suitable predetermined time intervals can be used, such as for example, five seconds. Alternatively, the parameter can be received substantially continuously. In an alternate embodiment, the operating parameter is received during an initial load and at the predetermined time intervals while the server device 104 or the application 109 and the client device 102a are in communication with one another.

In another implementation of receiving 210, receiving 210 further comprises monitoring a period of inactivity of the client device 102a. In one embodiment, monitoring comprises monitoring the inactivity of the client processor 110. Alternatively, the inactivity of other features of the client device 102a, such as for example, memory usage, event queue usage, and event frequency can be monitored. In an embodiment, the period of inactivity comprises a first time and a second time. In one embodiment, the second time is greater than the first time.

In another implementation of receiving 210, receiving the operating parameter further comprises receiving information regarding a bandwidth use of the client device 102a. The bandwidth may include, for example, the total capacity of the available bandwidth, an amount of bandwidth being used at a given time, and a frequency of bandwidth usage. These receiving embodiments discussed above are merely examples. One or more of these or other operating parameters may be received and/or monitored and used.

Bandwidth generally refers to an amount of information that can be carried or transported over a wired or wireless communication pathway or network in a given period of time. A broadband bandwidth is generally one that may be able to carry sufficient information to transmit and sustain a relatively bandwidth-intensive application, such as a succession of images in a video conference or presentation. Bandwidth otherwise may refer to the width of the range of frequencies that an electronic signal occupies on a transmission medium. Thus, any digital or analog signal has a bandwidth.

In a digital system, including the system 100 described in FIG. 1, bandwidth is expressed as bits of data per second ("bps"). Thus, a device, such as a modem, that works at 57,600 bps has twice the bandwidth of a device that works at 28,800 bps. In analog systems, bandwidth is expressed in terms of the difference between the highest-frequency signal component and the lowest-frequency signal component (generally measured in hertz). Communications pathways usually comprise a succession of links, each with its own bandwidth. If one of these links is slower than the rest, it is generally referred to as a bandwidth bottleneck.

The various devices of the system 100 shown in FIG. 1, may each comprise a link in a communication pathway. As described above, the multiple client devices 102a-n are in communication with the server device 104 over network 106. The network 106 comprises the Internet, but in other embodiments, the network may comprise an intranet. The devices 102a-n may communicate with the network 106 via modems (not shown) of various bandwidths, such as 57.6 kbps or broadband. The modems of the devices 102a-n may communicate with the network 106 over telephone lines, fiber-optic cables, co-axial cable, or wirelessly, such as with routers, repeaters, or via satellite. Other suitable means of communication can be used.

As will be discussed below, resource throttling can be modified according to varying, predetermined periods of inactivity. For example, a given resource usage will be allowed at the first time, e.g., three minutes. However, at a second time, e.g., five minutes of inactivity, the resource usage can be throttled-up. Likewise, at a third time, e.g., two minutes, the resource usage of the client device 102a can be throttled-back. In one embodiment, a time less than the first time will prohibit a resource usage, e.g., throttling resource usage to zero.

As indicated by block 220, the method 200 further comprises assigning a value to a usage variable associated with the operating parameter of the client device 102a. In one embodiment, the assigning step 220 is performed by the application 109. In other embodiments, the assigning step 220 is performed by the server device 104, the client processor 110, or other device or processor.

In one embodiment, the usage variable is a quantitative performance measure of the client device 102a associated with (or based at least in part on) the operating parameter. Usage variables express a measure or performance characteristic of a specific operating parameter, and may be equal to the operating parameter. For example, the operating parameter received is a load of the client processor 110. A usage variable of 25% load indicates that three-quarters of the available computational capacity of the client processor 110 is available for usage.

In one embodiment, the value is an ordinal ranking of the usage variable representing a qualitative performance measure of the client device 102a. For example, the qualitative performance measure can be expressed as low, medium, and high. Other values may be assigned, as these are only examples.

As one example, when the client device 102a has a load of 25%, it likely will perform better (i.e., the user 112a will not likely perceive that its interaction with the client device 102a has slow response time or is otherwise affected) than when it has a load of 75%. Thus, one can assign a value of "1" where the load of the processor 110 is 25% or less, a value of "2" where the load is between 25 and 50%, a value of "3" where the load is between 50% and 75%, and a value of "4" where the load is greater than 75%. In such a scale, the value of "1" represents the greatest predicted level of performance for the client device 102a and the value of "4" represents the lowest predicted level of performance of the client device 102a.

Other suitable values and usage variables can be used. For example, the scale of values can include more than the four gradations described above. The values assigned to usage variables will depend on various factors, including the type of operating parameter(s) selected for monitoring.

As another example, one can assign a usage variable to a bandwidth parameter, such as for example, bandwidth load. The total bandwidth may include for example, the bandwidth available over devices such, as a modem for communication between the client device 102a and the server. Thus, a bandwidth load of 25% would indicate that one-quarter of the available bandwidth is being used, leaving the remaining three-quarters of the total bandwidth as available. Thus, one can assign a value of "1" where the bandwidth load is 25% or less, a value of "2" where the load is between 25% and 50%, a value of "3" where the load is between 50% and 75%, and a value of "4" where the load is greater than 75%. In such a scale, the value of "1" represents the greatest predicted level of performance for the client device 102a and the value of "4" represents the lowest predicted level of performance of the client device 102a. Other suitable usage variables and values can be used.

As indicated by block 230, the method 200 further comprises correlating by the application 109 a resource usage level of the application 109 with the usage variable. In correlating the resource usage level, the application 109 modifies its own execution based on the usage variable. In this manner, the resource usage can be regulated or "throttled." Several examples follow.

The following table illustrates an example of one such embodiment. In the table, the operating parameter is the usage of the client processor 110 and the usage variable is expressed as the load of the client processor 110. For each usage variable, there is a corresponding resource usage level (right column) by the application 109.

| Client Processor Load | Resource Usage Level |
| --- | --- |
| <25% | 15% |
| 25% to 50% | 10% |
| 50% to 75% | 5% |
| >75% | 1% |

As seen in the table above, the resource usage level corresponds to the level of "throttling." Thus, where the client processor load is less than or equal to 25%, the resource usage is fully throttled. Where the client processor load is greater than 75%, the resource usage is throttled back. In this example, a client processor load of 25% correlates to a resource usage level by the application 109 of approximately 15%, whereas a client processor load of greater than 75% correlates to a resource usage level by the application of approximately 1%. The resource usage may also change smoothly with changes in the usage variable. For example, if the usage variable indicates the percentage of processor load, the resource usage may be set to (100-Current Load)/2, i.e., one-half of the available load.

The amount of usage, i.e., the resource usage level, by the application 109 in this exemplary embodiment is further correlated with the period of inactivity of the client device 102a, i.e., the first time. In this exemplary embodiment, the period of inactivity is less than approximately three minutes. As shown in the table above, where the period of inactivity of the client device 102a is less than approximately three minutes and the client processor load is less than 25%, the resource usage level of the client processor 110 is limited to approximately 10%.

In another embodiment, the method 200 further comprises correlating the resource usage level of the application 109 with the second time, i.e., greater than approximately three minutes. Although not shown in the table above, the resource usage level of the application 109 at the second time is greater than that shown for the first time, i.e., three minutes, so long as the load of the client processor 110 is less than approximately 75%. Where the client processor load is greater than approximately 75%, the resource usage level of the application 109 is generally limited to approximately 5%.

For example, where the period of inactivity of the client device 102a is greater than three minutes and where the processor load is less than 25%, the resource usage level of the application 109 is greater than 15%. Other suitable parameters and correlations can be used.

As discussed above, the parameters are received and/or monitored in the embodiment shown at a predetermined interval, and the correlation is adjusted with changing values over time. Likewise, the period of inactivity of the client device 102a is received and/or monitored at a predetermined interval. In one embodiment, the inactivity of the client device 102a is monitored substantially continuously.

The following table illustrates another embodiment of correlation 230. In this alternate embodiment, the parameter comprises a first parameter and a second parameter. The first parameter comprises a speed of the client processor 110 and the second parameter comprises a capacity of the client memory storage device 108. Thus, the resource usage level of the application 109 can be a combination of two or more parameters.

| Client Device Performance | Client Processor Speed | Capacity of Client Memory Storage | Resource Usage Level |
| --- | --- | --- | --- |
| 1 | 300 MHz to 800 GHz | 64 MB to 128 MB | 5 MB |
| 2 | 800 MHz to 1.5 GHz | 128 MB to 255 MB | 5 MB to 10 MB |
| 3 | >1.6 GHz | 129 MB to 256 MB | 10 MB to 20 MB |

The first column indicates the value, expressed in an ordinal ranking of a measure of predicted client device 102a performance, where 1 represents "low" performance, 2 represents "medium" performance, and 3 represents "high" performance. As discussed above, performance levels represent expected or predicted levels of client device 102a performance.

Thus, a client device 102a having a "high" performance is expected to be able to devote more of its resources to the application 109 than a client device 102a having a "low" performance and still be able to carry out its other tasks without the user 112a observing readily noticeable or degraded performance, such as response time, of the client device 102a.

The second column includes the first parameter, which comprises the speed of the client processor 110, expressed in megahertz (MHz) and gigahertz (GHz). The third column includes the second parameter, which comprises the capacity of the client memory storage device 108, expressed in megabytes (MB). The fourth column is the maximum resource usage of the application 109, also expressed in megabytes.

The following table illustrates another embodiment of correlation 230. In this alternate embodiment, the operating parameter comprises a bandwidth load. In the table, the parameter is the usage of the bandwidth of the client device 102a and the usage variable is expressed as the bandwidth load. For each value, there is a corresponding usage level (right column) of the bandwidth of the client device 102a.

| Client Bandwidth Load | Resource Usage Level |
| --- | --- |
| <25% | 15% |
| 25% to 50% | 10% |
| 50% to 75% | 5% |
| >75% | 1% |

As seen in the table above, the usage level of the client bandwidth corresponds to the level of "throttling." Thus, where the client bandwidth load is less than or equal to 25%, the resource usage is fully throttled. Where the client bandwidth load is greater than 75%, the resource usage is throttled back. In this example, a client bandwidth load of 25% correlates to a resource usage level of approximately 15%, whereas a client bandwidth load of greater than 75% correlates to a resource usage level of approximately 1%.

As discussed above, the parameters are received and/or monitored at an initial load, and at a predetermined interval. The correlation is adjusted with changing usage variables. The correlations described above generally reduce the likelihood of occurrences of file swapping by the client device 102a. File swapping typically occurs when the client device 102a lacks adequate memory, which results in delay while the client device 102a loads the swapped application when sufficient memory 108 becomes available. Other suitable parameters and correlations can be used.

In another embodiment, the application 109 uses the client device 102a as the client device 102a writes to the computer readable medium of the client memory storage device 108. Preferably, this is done such that the user 112a of the client device 102a will not likely perceive that its interaction with the server device 104 affects the client device's 102a response time or other capability.

In another embodiment, correlating by an application 109 a resource usage level of the application 109 with the usage variable comprises performing an activity affecting a usage variable proximate to a time that the usage variable indicates an existing activity. For example, the application 109 detects when other applications or the operating system of the client device 102a is writing to the computer local storage device, e.g., hard drive, ZIP drive, etc. It then performs its own writing activity to the local storage device at the same time. This can result in multiple improvements, for example combining the activity with existing activity can reduce the overall work required when writing to disk, and the user may prefer to have disk activity combined with existing disk activity than introduce new periods of disk activity which may be distracting. The method is particularly beneficial for mobile computing devices, such as laptops, where power conservation is very important, and the disk may stop spinning to reduce power usage. Further, reading or writing to disk can cause the operating system to swap inactive memory from other applications to disk, therefore, if an application reads or writes to disk during periods of inactivity, the other applications the user is using may be partially or completely swapped to disk when they return.

In another implementation of correlating 230, correlating by an application 109 a resource usage level of the application 109 with the usage variable comprises suspending one or more operations when the usage variable exceeds a threshold. In still another implementation of correlating 230, correlating by an application 109 a resource usage level of the application 109 with the usage variable comprises adjusting a rate of operation based at least in part on the usage variable.

In yet another implementation of correlating 230, correlating by an application 109 a resource usage level of the application 109 with the usage variable comprises adjusting a sequence of operations based at least in part on the usage variable. For example, operations may be performed in sequence rather than in parallel. In still a further implementation of correlating 230, correlating by an application 109 a resource usage level of the application 109 with the usage variable comprises adjusting an active feature based at least in part on the usage variable. For example, a given feature may be turned off or disabled if there is insufficient capacity in memory 108.

A computer readable medium of a server device, a resource regulating application, processor, or other device or application comprises instructions, that, when executed, cause the server device, application, processor, or other device or application to perform method 200. Preferably, the server device, resource regulating application, and the computer readable medium are similar to that described above and with reference to FIG. 1. Alternatively, other suitable server devices, applications, computer readable media, processors, or other devices or applications can be used. The configuration of the system 100 and the method 200 will not be repeated here.

While the present invention has been disclosed with reference to certain embodiments, numerous modifications, alterations, and changes to the described embodiments are possible without departing from the sphere and scope of the present invention, as defined by the appended claims. Accordingly, it is intended that the present invention not be limited to the described embodiments, but that it has the full scope defined by the language of the following claims, and equivalents thereof.

What is claimed is:

1. A method comprising:
receiving, by an application executed by an operating system, a plurality of operating parameters having values describing a plurality of different types of resources of a client device;
determining a value representing an estimate of current load on the client device based at least in part on a combination of the plurality of operating parameter values describing the plurality of different types of resources of the client device;
assigning the value representing the estimate of current load on the client device to a usage variable; and
correlating by the application a level of throttling of the application with the usage variable, the correlating comprising:
examining a representation of a mapping of estimates of load on the client device to levels of throttling, wherein each tuple in the mapping maps a particular estimate of load on the client device to a particular level of throttling;
identifying a tuple of the mapping for which the particular value of the estimate of load on the client device matches the estimate of current load on the client device; and
the application modifying its own execution to throttle its usage to the level of throttling specified by the identified tuple.

2. The method of claim 1, wherein the application modifying its own execution comprises the application suspending one or more operations when the value assigned to the usage variable exceeds a threshold.

3. The method of claim 1, wherein the application modifying its own execution comprises the application performing an activity affecting the usage variable within a threshold time of the usage variable indicating that the client device is performing an existing activity.

4. The method of claim 1, wherein the application modifying its own execution comprises the application adjusting a rate of operation based at least in part on the value assigned to the usage variable.

5. The method of claim 1, wherein the application modifying its own execution comprises the application adjusting a sequence of operations based at least in part on the value assigned to the usage variable.

6. The method of claim 1, wherein the application modifying its own execution comprises the application adjusting an active feature based at least in part on the value assigned to the usage variable.

7. The method of claim 1, wherein the client device comprises a client processor and a client memory storage device.

8. The method of claim 7, wherein receiving the plurality of operating parameters comprises receiving at least one of the plurality of operating parameters during an initial load of the client processor.

9. The method of claim 7, further comprising writing to a non-transitory computer readable storage medium of the client memory storage device.

10. The method of claim 7, wherein the plurality of operating parameters comprise a first parameter and a second parameter, the first parameter comprising a speed of the client processor and the second parameter comprising a capacity of the client memory storage device.

11. The method of claim 1, wherein receiving the plurality of operating parameters comprises monitoring at least one of the plurality of the operating parameters.

12. The method of claim 1, further comprising monitoring a period of inactivity of the client device.

13. The method of claim 1, wherein receiving the plurality of operating parameters comprises receiving at least one of the plurality of operating parameters during a predetermined time interval.

14. The method of claim 13, wherein at least one of the plurality of operating parameters comprises a client processor load.

15. The method of claim 1, wherein the usage variable is a quantitative performance measure of the client device.

16. The method of claim 1, wherein the usage variable is a qualitative performance measure of the client device.

17. The method of claim 1, wherein the application modifying its own execution further comprises the application throttling back its usage of the client device.

18. The method of claim 1, wherein the application dynamically modifies its own execution based on dynamic changes to the value assigned to the usage variable.

19. The method of claim 1, wherein the application modifying its own execution further comprises the application pausing between execution of resource-intensive calculations.

20. The method of claim 1, wherein a resource used by the application is memory and wherein the application modifying its own execution further comprises the application dynamically scaling back its memory usage based on dynamic changes to the value assigned to the usage variable.

21. The method of claim 1, wherein a resource used by the application is network bandwidth and wherein the application modifying its own execution further comprises the application throttling-back usage of network bandwidth based on dynamic changes to the value assigned to the usage variable.

22. The method of claim 1, wherein the representation of the mapping comprises a table having a column representing the usage variable and a column representing the resource usage level of the application and each tuple in the mapping corresponds to a row in the table.

23. The method of claim 1, wherein there are a plurality of usage variables and wherein the correlating comprises the application modifying its own execution based at least in part on changes to values assigned to the plurality of usage variables.

24. The method of claim 1, wherein the application modifying its own execution comprises the application combining an activity performed by the application with another activity performed on the client device, the combining reducing resources of the client device consumed by the combined activities.

25. The method of claim 24, wherein the combined activities are disk activities.

26. A non-transitory computer readable storage medium comprising instructions, that, when executed, cause an application to perform steps comprising:
receiving, by an application executed by an operating system, a plurality of operating parameters having values describing a plurality of different types of resources of a client device;
determining a value representing an estimate of current load on the client device based at least in part on a combination of the plurality of operating parameter values describing the plurality of different types of resources of the client device;

assigning the value representing the estimate of current load on the client device to a usage variable; and correlating by the application a level of throttling of the application with the usage variable, the correlating comprising:

examining a representation of a mapping of estimates of load on the client device to levels of throttling, wherein each tuple in the mapping maps a particular value estimate of load on the client device to a particular level of throttling;

identifying a tuple of the mapping for which the particular value of the estimate of load on the client device matches the estimate of current load on the client device; and the application modifying its own execution to throttle its usage to the level of throttling specified by the identified tuple.

27. The non-transitory computer readable storage medium of claim 26, wherein the application modifying its own execution comprises the application suspending one or more operations when the value assigned to the usage variable exceeds a threshold.

28. The non-transitory computer readable storage medium of claim 26, wherein the application modifying its own execution comprises the application performing an activity affecting the usage variable within a threshold time of the usage variable indicating that the client device is performing an existing activity.

29. The non-transitory computer readable storage medium of claim 26, wherein the application modifying its own execution comprises the application adjusting a rate of operation based at least in part on the value assigned to the usage variable.

30. The non-transitory computer readable storage medium of claim 26, wherein the application modifying its own execution comprises the application adjusting a sequence of operations based at least in part on the value assigned to the usage variable.

31. The non-transitory computer readable storage medium of claim 26, wherein the application modifying its own execution comprises the application adjusting an active feature based at least in part on the value assigned to the usage variable.

32. The non-transitory computer readable storage medium of claim 26, wherein the client device comprises a client processor and a client memory storage device.

33. The non-transitory computer readable storage medium of claim 32, wherein receiving the plurality of operating parameters comprises receiving at least one of the plurality of operating parameters during an initial load of the client processor.

34. The non-transitory computer readable storage medium of claim 32, wherein receiving the plurality of operating parameters comprises receiving at least one of the plurality of operating parameters during a predetermined time interval.

35. The non-transitory computer readable storage medium of claim 34, wherein at least one of the plurality of operating parameters comprises a client processor load.

36. The non-transitory computer readable storage medium of claim 32, further comprising instructions, that, when executed, cause the application to perform the step of writing to a non-transitory computer readable storage medium of the client memory storage device.

37. The non-transitory computer readable storage medium of claim 32, wherein the plurality of operating parameters comprise a first parameter and a second parameter, the first parameter comprising a speed of the client processor and the second parameter comprising a capacity of the client memory storage device.

38. The non-transitory computer readable storage medium of claim 26, further comprising instructions, that, when executed, cause the application to perform the step of monitoring a period of inactivity of the client device.

39. The non-transitory computer readable storage medium of claim 26, wherein receiving the plurality of operating parameters comprises monitoring at least one of the plurality of operating parameters.

40. The non-transitory computer readable storage medium of claim 26, wherein the representation of the mapping comprises a table having a column representing the usage variable and a column representing the resource usage level of the application and each tuple in the mapping corresponds to a row in the table.

41. A method comprising:

receiving, by an application executed by an operating system, a plurality of operating parameters having values describing a plurality of different types of resources of a client device;

determining a value representing an estimate of current load on the client device based at least in part on a combination of the plurality of operating parameter values;

examining a representation of a mapping comprising tuples, each tuple specifying a mapping from an estimate of load on the client device to a level of throttling, wherein the estimate of load specified in a tuple is based on a usage of a particular combination of resources of the client device;

identifying a tuple, in the representation of the mapping, for which the particular value of the estimate of load on the client device specified in the tuple matches the value representing the estimate of current load on the client device; and modifying, by the application, execution of the application to throttle its usage to the level of throttling specified by the identified tuple.

* * * * *